(12) United States Patent
Kobayashi et al.

(10) Patent No.: US 9,735,963 B2
(45) Date of Patent: Aug. 15, 2017

(54) DECRYPTION SERVICE PROVIDING DEVICE, PROCESSING DEVICE, SAFETY EVALUATION DEVICE, PROGRAM, AND RECORDING MEDIUM

(71) Applicant: NIPPON TELEGRAPH AND TELEPHONE CORPORATION, Chiyoda-ku (JP)

(72) Inventors: Tetsutaro Kobayashi, Tokyo (JP); Go Yamamoto, Tokyo (JP); Hitoshi Fuji, Tokyo (JP); Tomohide Yamamoto, Tokyo (JP); Reo Yoshida, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 68 days.

(21) Appl. No.: 14/760,636

(22) PCT Filed: Jan. 15, 2014

(86) PCT No.: PCT/JP2014/050574
§ 371 (c)(1),
(2) Date: Jul. 13, 2015

(87) PCT Pub. No.: WO2014/112523
PCT Pub. Date: Jul. 24, 2014

(65) Prior Publication Data
US 2015/0358162 A1  Dec. 10, 2015

(30) Foreign Application Priority Data
Jan. 16, 2013  (JP) .................................. 2013-005282

(51) Int. Cl.
*H04L 29/00* (2006.01)
*H04L 9/30* (2006.01)

(52) U.S. Cl.
CPC ................................ *H04L 9/3013* (2013.01)

(58) Field of Classification Search
CPC .................................... G06F 7/04; H04L 9/00
(Continued)

(56) References Cited

U.S. PATENT DOCUMENTS 6,377,688 B1   4/2002  Numao
8,522,027 B2 *  8/2013  Canard .................. H04L 9/3271
                                                     380/46

(Continued)

FOREIGN PATENT DOCUMENTS

JP   10 301491   11/1998
JP   2012 151756   8/2012
(Continued)

OTHER PUBLICATIONS

Boneh, D., et al., "A Method for Fast Revocation of Public Key Certificates and Security Capabilities", Proceedings of the 10th USENIX Security Symposium, (2001), (Total pp. 13).

(Continued)

*Primary Examiner* — Brandon Hoffman
*Assistant Examiner* — Michael D Anderson
(74) *Attorney, Agent, or Firm* — Oblon, McClelland, Maier & Neustadt, L.L.P.

(57) ABSTRACT

A private key is held which conforms to an ElGamal encryption system on a semigroup, calculation of an order of an element of the semigroup being computationally difficult, information corresponding to ciphertext conforming to the ElGamal encryption system is input, a private key s is used to decrypt the information corresponding to the ciphertext in conformance to the ElGamal encryption system, and information corresponding to a result of decrypting the ciphertext is obtained and output. Alternatively, whether it is computationally difficult or easy to calculate the order of the element of the semigroup is determined, and the safety of a (Continued)

decryption service providing device is evaluated based on the determination result.

15 Claims, 9 Drawing Sheets

(58) Field of Classification Search
USPC .................................................... 713/189
See application file for complete search history.

(56) References Cited

U.S. PATENT DOCUMENTS

| | | | |
|---|---|---|---|
| 8,806,658 B2 * | 8/2014 | Lee .................. | G06F 21/10 726/29 |
| 2011/0107102 A1 | 5/2011 | Canard et al. | |
| 2012/0323981 A1 | 12/2012 | Yamamoto et al. | |
| 2013/0318360 A1 | 11/2013 | Yamamoto et al. | |

FOREIGN PATENT DOCUMENTS

| | | |
|---|---|---|
| JP | 2012-220814 A | 11/2012 |
| JP | 2012-220834 A | 11/2012 |
| JP | 2012-237881 A | 12/2012 |
| WO | WO 2011/086992 A1 | 7/2011 |
| WO | WO 2012/057134 A1 | 5/2012 |

OTHER PUBLICATIONS

Yamamoto, G., et al., "Is it possible to extract secret keys from public decryption services", The 30$^{th}$ Symposium on Cryptography and Information Security, The Institute of Electronics, Information and Communication Engineers, (2013), (Total pp. 4) (with English abstract).

Elgamal, T., "A Public Key Cryptosystem and a Signature Scheme Based on Discrete Logarithms", Crypto 84, (1998), pp. 10-18.

Miller, G.L., "Riemann's Hypothesis and Tests for Primality", Journal of Computer and System Sciences, vol. 13, (1976), pp. 300-317.

Lenstra, Jr., H.W., "Factoring Integers with Elliptic Curves", The Annals of Mathematics, Second Series, vol. 126, Issue 3, (1987), (Total pp. 26).

International Search Report Issued Mar. 11, 2014 in PCT/JP2014/050574 Filed Jan. 15, 2014.

Extended Search Report issued Oct. 12, 2016 in European Patent application No. 14741137.5.

Jens Zumbrägel, "Public-Key Cryptography Based on Simple Semirings", Dissertation, Univesität Zürich, Jan. 2008, XP007919946, pp. 1-109.

Zhenfu Cao et al, "New Public Key Cryptosystems Using Polynomials over Non-commutative Rings", International Association for Cryptologic Research, vol. 20070119:094247, Jan. 2007, XP061002233, pp. 1-35.

Dörte Rappe, "Homomorphic Cryptosystems and their Applications", International Association for Cryptologic Research, vol. 20060103:084929, Dec. 2005, XP061001719, pp. 1-114.

Office Action dated May 3, 2017, in Chinese Patent Application No. 201480005006.6 (with English-language translation).

* cited by examiner

DECRYPTION SERVICE PROVIDING DEVICE, PROCESSING DEVICE, SAFETY EVALUATION DEVICE, PROGRAM, AND RECORDING MEDIUM

TECHNICAL FIELD

The present invention relates to an information security technique, particularly to a key management technique for limiting authorized persons who can decrypt and use encrypted information.

BACKGROUND ART

To decrypt information encrypted by a currently common technique, a method is adopted by which a key used in cryptographic algorithms is used to directly compute plaintext from ciphertext (see Non-Patent Literature 1, for example).

However, if the situation has changed after the key was passed to an authorized person and it is desirable to prevent the authorized person from performing decryption with the key, this method cannot force the prohibition of decryption of the encryption.

Thus, instead of distributing the key to authorized persons, a method is considered by which the key is held in the inside of a reliable server device and the server device provides a decryption service in response to a request from an authorized person. Such a method is referred to as a cloud-managed key cryptographic scheme. This method does not directly pass a key used in cryptographic algorithms to users, and therefore is expected to be able to stop the users from using encrypted data by stopping a decryption service.

PRIOR ART LITERATURE

Non-Patent Literature

Non-Patent Literature 1: Taher Elgamal, A Public-Key Cryptosystem and a Signature Scheme Based on Discrete Logarithms, IEEE Transactions on Information Theory, v. IT-31, n. 4, 1985, pp. 469-472 or CRYPTO 84, pp. 10-18, Springer-Verlag

SUMMARY OF THE INVENTION

Problems to be Solved by the Invention

When a decryption service is provided while a key is held in the inside, depending on encryption systems, a user may acquire the capability of decrypting the encryption through repeated use of the decryption service, and it may be impossible to stop the user from using encrypted data even when the decryption service is stopped. Such a cloud-managed key cryptographic scheme has a problem with safety.

The present invention addresses this issue with the object of providing a technique for improving the safety of a cloud-managed key cryptographic scheme.

Means to Solve the Problems

A private key is held which conforms to an ElGamal encryption system on a semigroup, calculation of an order of an element of the semigroup being computationally difficult, information corresponding to ciphertext conforming to the ElGamal encryption system is input, a private key s is used to decrypt the information corresponding to the ciphertext in conformance to the ElGamal encryption system, and information corresponding to a result of decrypting the ciphertext is obtained and output.

Effects of the Invention

The use of the present invention makes it possible to keep a user from acquiring the capability of decrypting the encryption through repeated use of a decryption service, and to improve the safety of a cloud-managed key cryptographic scheme.

DETAILED DESCRIPTION OF THE EMBODIMENTS

Embodiments of the present invention will be described.
<Principles>
Principles common to the embodiments will be described. In each embodiment, a key is held in the inside of a reliable decryption service providing device and the decryption service providing device provides a decryption service in response to a request from an authorized person (cloud-managed key cryptographic scheme). It should be noted that each embodiment uses a semigroup (for example, a commutative semigroup or a finite commutative semigroup) H, calculation of an order of an element of the semigroup H being computationally difficult, and uses a decryption service for which ElGamal encryption on the semigroup H is adopted as an encryption system. The reason why the decryption service is safe will be described below.

[ElGamal Encryption System]

The ElGamal encryption on the semigroup H will next be described. The ElGamal encryption is an encryption system in which a certain invertible element of the semigroup H is $g \in H$, and for a randomly selected private key $s \in Z_q$, a public key is $y = g^{-s} \in H$; ciphertext for plaintext $m \in g$ is given by $(c_1, c_2) = (m \cdot y^r, g^r) \in H^2$. $r \in Z_q$ is a random number decided in the course of encryption, $Z_q$ is a residue class group by q, q is an order (positive integer, for example, a prime number) of the semigroup H, $\beta \in H$ indicates that β is an element of the semigroup H, and "·" indicates an operation defined in the semigroup H. To decrypt the ciphertext $(c_1, c_2)$, it is only necessary to compute $m'=c_1 \cdot c_2^s \in H$ using the private key s.

A decryption service providing device with the ElGamal encryption safely holds the private key s, and each time a user inputs ciphertext $(c_1, c_2)$, the decryption service providing device decrypts the ciphertext $(c_1, c_2)$ and outputs a decryption result m'. At this time, the decryption service providing device may identify the user by an authentication means, determine whether to provide a decryption service to the user using an authentication database that contains users who are duly allowed to receive the decryption service, and then output the decryption result.

[Attack Against the Decryption Service Providing Device with the ElGamal Encryption]

A polynomial-time probabilistic algorithm B, which is an attacker that tries to extract the private key s through the decryption service providing device with the ElGamal encryption, is formulated. For a given public key $y=g^{-s}$, B makes an attack as follows.

1. For i=1, 2, 3, . . . , u (where u is a positive integer), B generates ciphertext $c(i)=(c_1(i), c_2(i))$, inputs each of them to the decryption service providing device, and obtains a decryption result $w(i)=c_1(i) \cdot c_2(i)^s$.

2. B performs a computation while using information for c(i) and w(i) and outputs $\alpha \in Z_q$ that satisfies $y=g^{-\alpha}$.

Suppose that B is successful in the above attack. An arbitrary polynomial-time probabilistic algorithm A, which is an attacker, can compute an order of an element g of the semigroup H using B by a method below. k is a security parameter of a positive integer.

1. For i=1, 2, 3, . . . , 3k, A performs the following and obtains $\beta_i$.

(a) Assuming that an element of the semigroup H is represented with L bits at most, A randomly selects a bit sequence $\lambda$ sufficiently longer than L, and regards, as the private key s, a value obtained by interpreting $\lambda$ as a binary number.

(b) A computes $y=g^{-s}$ and regards it as the public key.

(c) A obtains $\alpha$ that satisfies $y=g^{-\alpha}$ using B. If a decryption request is made from B during this processing, A performs decryption using s and gives a result to B.

(d) A regards $\beta_i = s - \alpha$.

2. A computes the greatest common divisor of $\beta_1, \beta_2, \ldots, \beta_{3k}$.

A outputs an order n of the element g, exclusive of a negligible probability of about $O(2^{-k})$ at most (O-notation). The reason will be described below. Because $y=g^{-s}=g^{-\alpha}$, $g^{\beta_i}=1$ for each i (superscript $\beta i$ represents $\beta_i$). Therefore, $\beta_i$ is an integral multiple of the order n of the element g of the semigroup H. Because s is randomly selected, an integer $r_i$ that satisfies $\beta_i = n r_i$ is random. A probability that the greatest common divisor of $r_1, r_2, \ldots, r_{3k}$ is not 1 can be evaluated using the Riemann zeta function, and can be proven to be smaller than or equal to $O(2^{-k})$ at most (the proof is described in, for example, the following literature: Go Yamamoto, Tetsutaro Kobayashi, "Self-correcting for homomorphism," Applied Number Theory, SCIS2010). Therefore, the greatest common divisor of $\beta_1, \beta_2, \ldots, \beta_{3k}$ is the order n of the element g. Thus, if the above attack against the decryption service providing device with the ElGamal encryption attains success, the order of the element g of the semigroup H can be computed. The contraposition is true; if it is difficult to calculate the order of the element g of the semigroup H, it is also difficult to make the above attack against the decryption service providing device with the ElGamal encryption.

An example of a semigroup, calculation of an order of an element of the semigroup being difficult, is the following. Assuming that N is a number that is difficult to factorize into prime factors, consider a residue class ring R=Z/NZ. A computation of an order of an element of a multiplicative group of R is known to be difficult, equally to factorization of N into prime factors (the proof is described in, for example, the following literature: G. Miller, "Riemann's hypothesis and tests for primality," Journal of Computer and System Science, vol. 13, pp. 300-317, 1976). That is, as a semigroup, calculation of an order of an element of the semigroup being difficult, for example, a multiplicative group of the residue class ring R=Z/NZ with N as a modulus can be used. Another example is an elliptic curve on the above ring R. Although a normal elliptic curve is configured on a field, if its operation rule is formally applied to the ring R, the associative law holds true as in the elliptic curve, and a semigroup is configured. When it is used as H, a random element extracted from H becomes an invertible element with a very high probability. When this is used as the element g, a computation of an order of the element g is known to be difficult, equally to a computation of factorization of N into prime factors (the details are described in, for example, the following literature: Lenstra Jr., H. W., "Factoring integers with elliptic curves," Annals of Mathematics 126 (3): 649-673, 1987). That is, as a semigroup, calculation of an order of an element of the semigroup being difficult, for example, a semigroup consisting of points (rational points) on the elliptic curve on the above ring R can be used. A semigroup, calculation of an order of an element of the semigroup being difficult, is, for example, a semigroup, calculation of an order of an element of the semigroup to solve a factorization problem being difficult. A fact that a certain computation or problem is "difficult" means that its computation result or solution cannot be obtained within polynomial-time. That is, a "semigroup, calculation of an order of an element of the semigroup being computationally difficult" means, for example, a semigroup the order of the element of which cannot be calculated within the polynomial-time. The "semigroup, calculation of an order of an element of the semigroup being computationally difficult" may be a semigroup that has an inverse element or may be a semigroup that does not have an inverse element. Moreover, the "semigroup, calculation of an order of an element of the semigroup being computationally difficult" may be, for example, a monoid (semigroup having an identity element). The "polynomial-time" means, for example, time (computation time) that can be represented with a polynomial of the size (length) of the private key s. That is, the "polynomial-time" means, for example, time (computation time) that can be represented with an arbitrary polynomial for $\chi$ when the length (for example, the bit length) of the private key s is $\chi$. "Easy" means "not difficult".

First Embodiment

A first embodiment will next be described. The present embodiment uses the semigroup (commutative semigroup) H, calculation of the order of the element g of the semigroup H being computationally difficult, and provides a decryption service in which the ElGamal encryption on the semigroup H is adopted as an encryption system. In the present embodiment, "information corresponding to ciphertext conforming to the ElGamal encryption system" is ciphertext conforming to the ElGamal encryption system, and "information corresponding to a ciphertext decryption result" is a ciphertext decryption result.

[Configuration]

Figure 1:
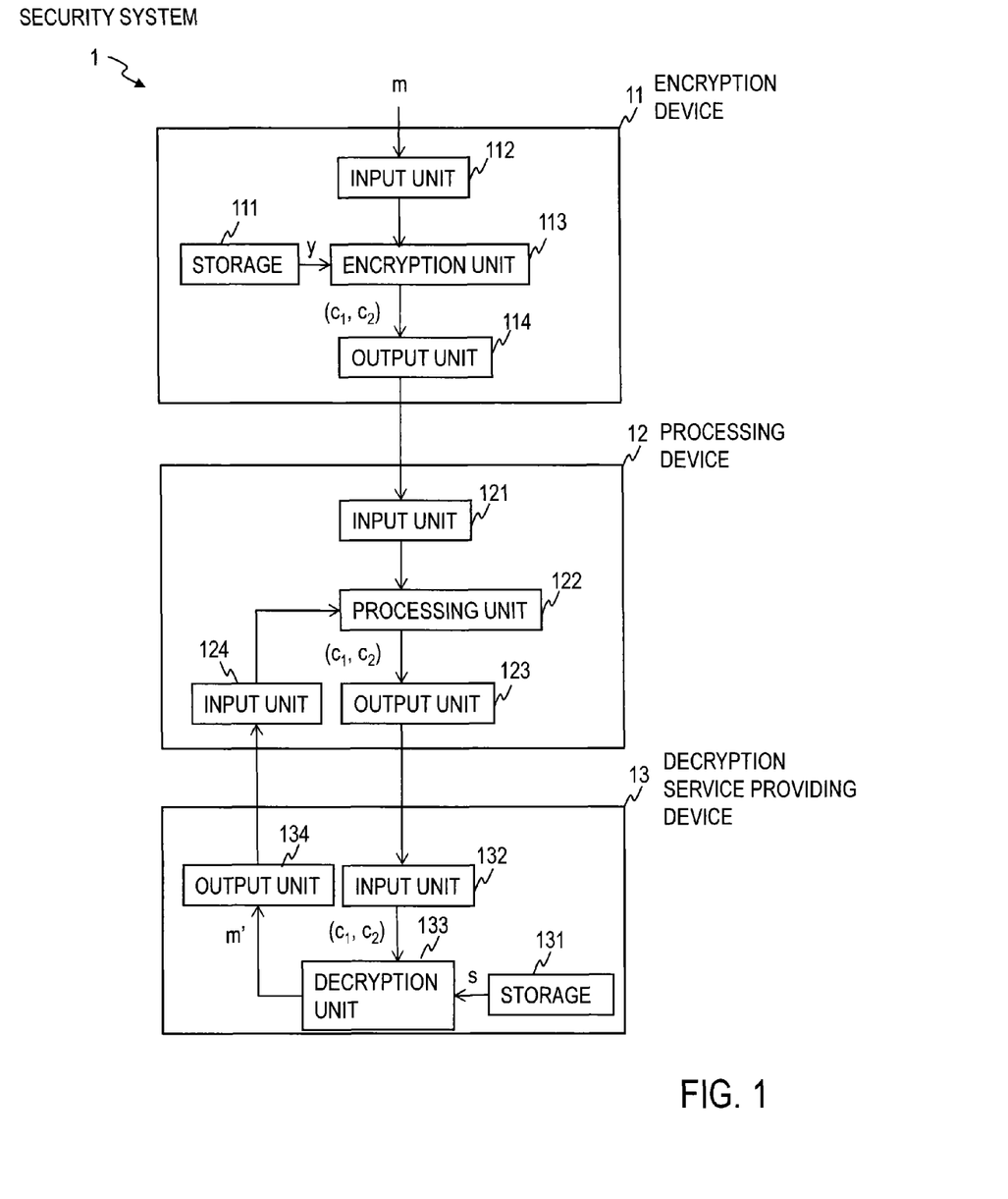
FIG. 1 is a block diagram illustrating a configuration of a security system of a first embodiment.

As illustrated in FIG. 1, a security system 1 of the present embodiment includes an encryption device 11, a processing device 12, and a decryption service providing device 13. The encryption device 11 is configured to be able to provide information to the processing device 12 through a network, a portable recording medium, or the like. In addition, the processing device 12 and the decryption service providing device 13 are configured to be able to exchange information with each other through a network, a portable recording medium, or the like.

The encryption device 11 includes a storage 111, an input unit 112, an encryption unit 113, and an output unit 114. The processing device 12 includes an input unit 121, a processing unit 122, an output unit 123, and an input unit 124. The decryption service providing device 13 includes a storage 131, an input unit 132, a decryption unit 133, and an output unit 134. Each of the encryption device 11, the processing device 12, and the decryption service providing device 13 is a specific device that includes a central processing unit (CPU), a random-access memory (RAM), or the like and is configured by reading a predetermined program to a general-purpose or dedicated computer. The encryption device 11, the processing device 12, and the decryption service providing device 13 perform each processing under control of respective controllers (not illustrated). Data obtained by each unit is stored in respective temporary memories (not illustrated) and read to each unit as necessary.

[Parameter Setting Processing]

In parameter setting processing of the present embodiment, system parameters including the semigroup H, calculation of the order of the element g of the semigroup H being computationally difficult, and the element g are set in the encryption device 11 and the decryption service providing device 13. The private key $s \in Z_q$ conforming to the ElGamal encryption system on the semigroup H is randomly selected and safely stored in the storage 131 of the decryption service providing device 13. The public key $y=g^s \in H$ conforming to the ElGamal encryption system on the semigroup H is generated and stored in the storage 111 of the encryption device 11.

[Encryption and Decryption Service Providing Processing]

Figure 2:
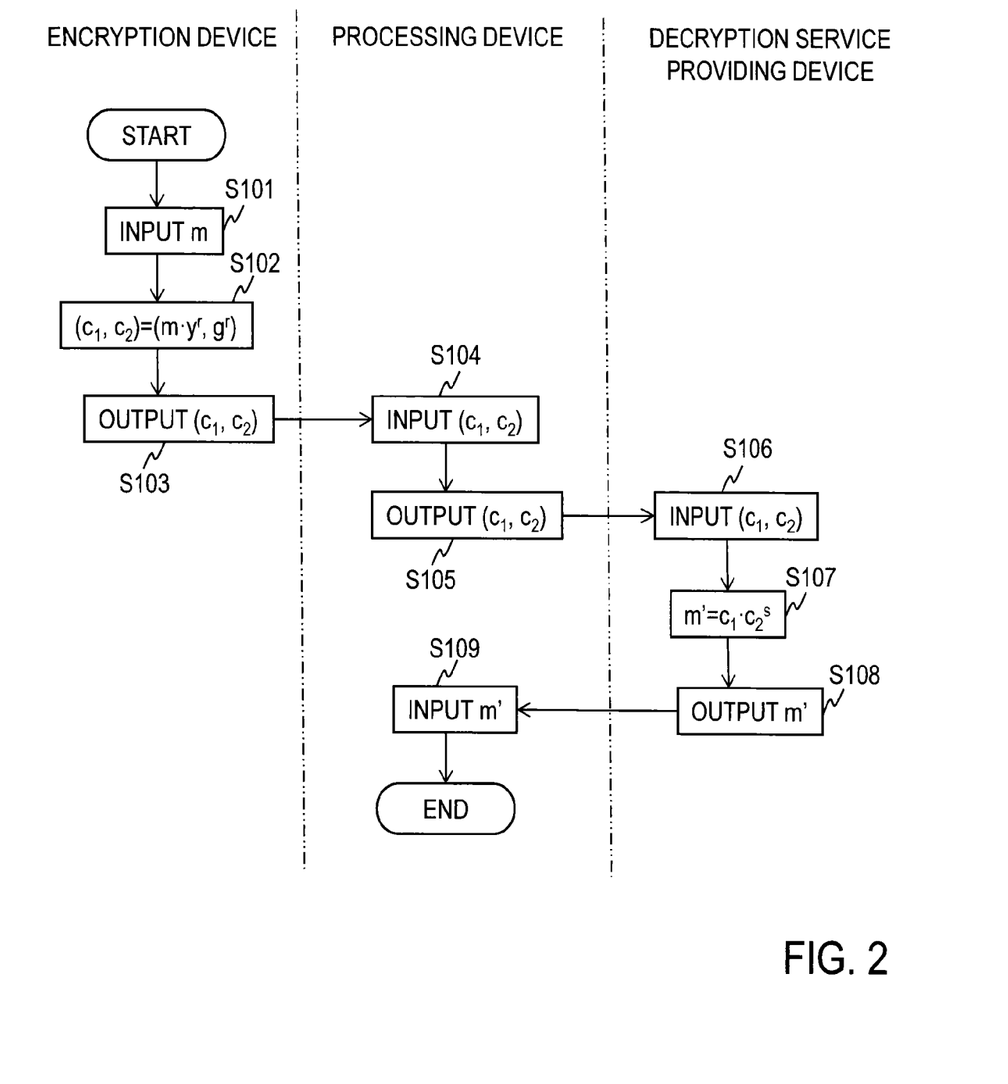
FIG. 2 is a flow diagram illustrating decryption service providing processing of the first embodiment.

As illustrated in FIG. 2, plaintext $m \in H$ is first input to the input unit 112 of the encryption device 11 and sent to the encryption unit 113 (step S101). The encryption unit 113 uses the public key y stored in the storage 111, encrypts the plaintext m in conformance to the ElGamal encryption system on the semigroup H, and obtains and outputs the ciphertext $(c_1, c_2)=(m \cdot y^r, g^r) \in H^2$ (step S102). The output unit 114 outputs the ciphertext $(c_1, c_2)$ (step S103).

The ciphertext $(c_1, c_2)$ is input to the input unit 121 of the processing device 12 and sent to the processing unit 122 (step S104). The processing unit 122 generates decryption request information including the ciphertext $(c_1, c_2)$ and outputs the information from the output unit 123 (step S105).

The decryption request information including the ciphertext $(c_1, c_2)$ is input to the input unit 132 of the decryption service providing device 13, and the ciphertext $(c_1, c_2)$ is sent to the decryption unit 133 (step S106). The decryption unit 133 uses the private key s stored in the storage 131, decrypts the ciphertext $(c_1, c_2)$ in conformance to the ElGamal encryption system on the semigroup H, and obtains and outputs a decryption result $m'=c_1 \cdot c_2^{-s} \in H$ (step S107). The output unit 134 outputs response information including the decryption result m' (step S108). The response information is input to the processing device 12 and sent to the processing unit 122 (step S109).

Features of the Present Embodiment

The present embodiment uses the decryption service providing device 13 that adopts the ElGamal encryption on the semigroup H, calculation of the order of the element g of the semigroup H being considered to be computationally difficult, and provides a decryption service. In this configuration, a fact that it is difficult for a user to obtain a private key even if the user repeatedly uses a decryption operation service can be proven, and a fact that the private key is not leaked in principle is guaranteed. In a generally safe encryption system, it is considered that the decryption capability cannot be acquired without obtaining the private key. Therefore, when control is performed to give permission for the decryption operation service to the user and then revoke the permission, it can be said that the user cannot decrypt an encrypted document after the revocation of the use of the service, whichever behavior the user is assumed to do.

Second Embodiment

A second embodiment will next be described. The present embodiment evaluates the safety of a decryption service by determining whether it is computationally difficult or easy to calculate an order of the element g of the semigroup H used for the decryption service. This enables evaluation of the safety of the decryption service. This evaluation of the safety of the decryption service may be performed when the system parameters are set or may be performed for the decryption service that has already been provided. As an example, the embodiment will be described below in which the safety of the decryption service is evaluated when the system parameters are set, and the system parameters are reset when the safety is determined to be low. In the present embodiment, "information corresponding to ciphertext conforming to the ElGamal encryption system" is ciphertext conforming to the ElGamal encryption system, and "information corresponding to a ciphertext decryption result" is a ciphertext decryption result. In addition, the description of the matters common to the first embodiment is omitted, using the same reference numerals as the first embodiment.

[Configuration]

Figure 3:
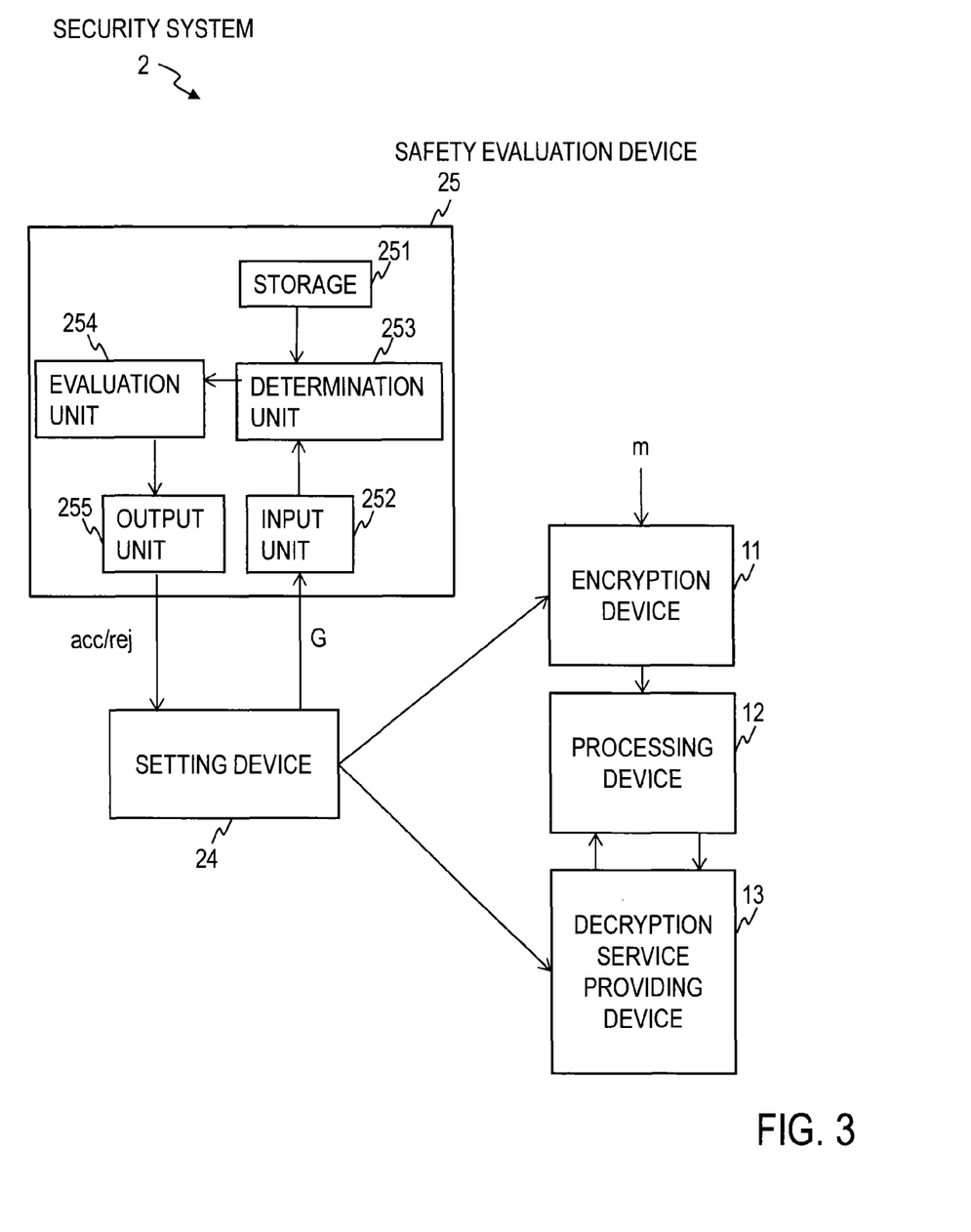
FIG. 3 is a block diagram illustrating a configuration of a security system of a second embodiment.

As illustrated in FIG. 3, a security system 2 of the present embodiment includes the encryption device 11, the processing device 12, the decryption service providing device 13, a setting device 24, and a safety evaluation device 25. The setting device 24 is configured to be able to provide information to the encryption device 11 and the decryption service providing device 13 through a network, a portable recording medium, or the like. The setting device 24 and the safety evaluation device 25 are configured to be able to exchange information with each other through a network, a portable recording medium, or the like. The setting device 24 and the safety evaluation device 25 are special devices that are configured by reading predetermined programs to general-purpose or dedicated computers.

The safety evaluation device 25 includes a storage 251, an input unit 252, a determination unit 253, an evaluation unit 254, and an output unit 255. The safety evaluation device 25 performs each processing under control of a controller (not illustrated). Data obtained by each unit is stored in respective temporary memories (not illustrated) and read to each unit as necessary.

[Parameter Setting Processing]

As preprocessing for the parameter setting processing of the present embodiment, information required to determine whether it is computationally difficult or easy to calculate an order of the element g of the semigroup H is stored in the storage 251 of the safety evaluation device 25. An example of such information includes: for example, a semigroup, calculation of the order of the element of the semigroup being considered to be difficult, and a list of the elements; a semigroup, calculation of the order of the element of the semigroup being considered to be easy, and a list of the elements; or an algorithm for determining the difficulty or easiness of the calculation, or the like.

Figure 4:
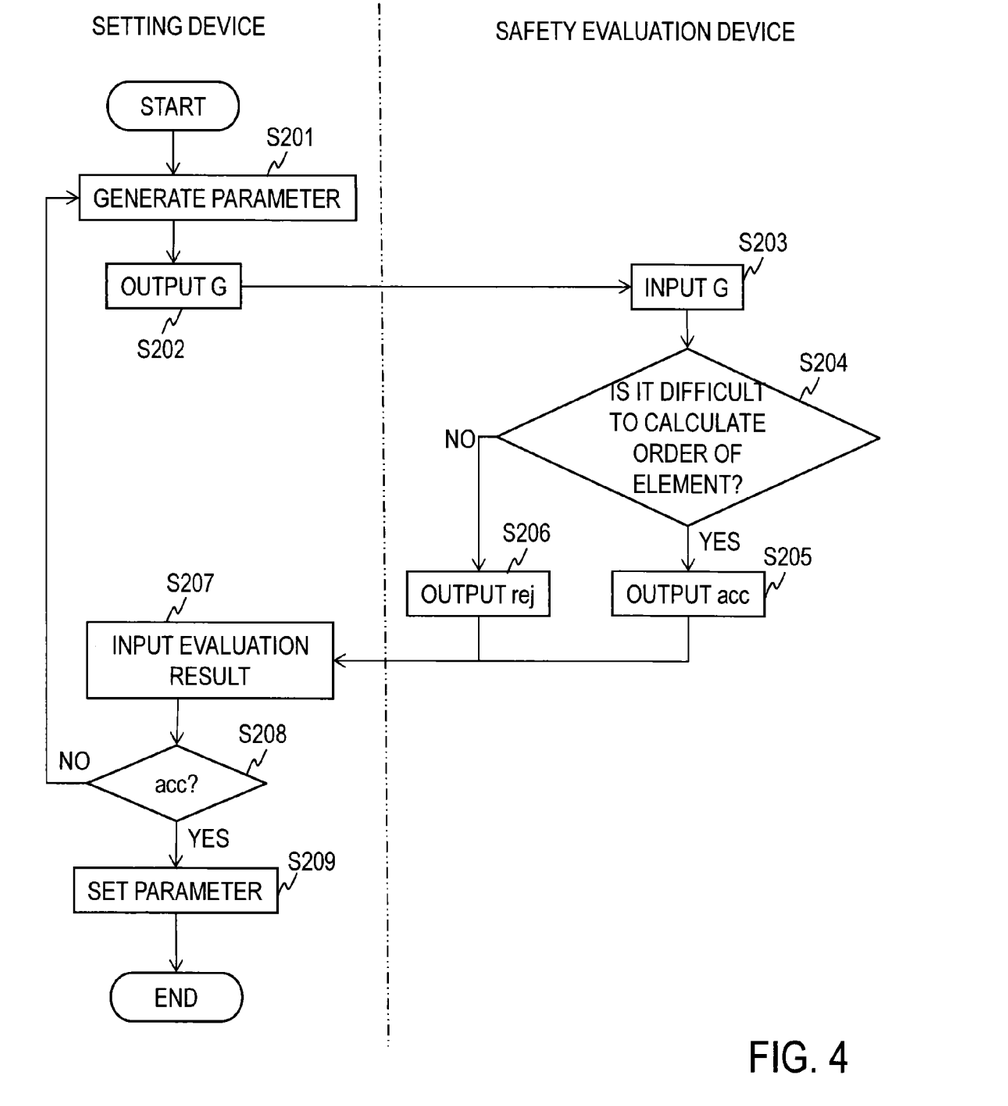
FIG. 4 is a flow diagram illustrating safety evaluation processing of the second embodiment.

As illustrated in FIG. 4, in the parameter setting processing, the setting device 24 generates system parameters including the semigroup (for example, a commutative semigroup or finite commutative semigroup) H and its element g (step S201), and outputs information that identifies the generated semigroup H and the element g (step S202).

The information that identifies the semigroup H and the element g is input to the input unit 252 of the safety evaluation device 25, and sent to the determination unit 253 (step S203). The determination unit 253 determines whether it is difficult or easy to calculate an order of the element g of the semigroup H using the information stored in the storage 251. For example, when a semigroup, calculation of the order of the element of the semigroup being considered to be difficult, and a list of the elements are stored in the storage 251, the determination unit 253 determines whether the element g of the semigroup H that is a determination target is included in the list, and determines that it is difficult to calculate the order of the element g of the semigroup H if the element g is included. Alternatively, the semigroup, calculation of the order of the element of the semigroup being considered to be easy, and the list of the elements are stored in the storage 251, the determination unit 253 determines whether the element g of the semigroup H that is a determination target is included in the list, and determines that it is easy to calculate the order of the element g of the semigroup H if the element g is included. When an algorithm for determining whether it is difficult or easy to calculate the order of the element of the semigroup is stored in the storage 251, the determination unit 253 uses the algorithm to determine whether it is difficult to calculate the order of the element g of the semigroup H that is the determination target, or it is easy to calculate the order of the element g of the semigroup H that is the determination target. For example, if a discrete logarithm problem in the semigroup H can be solved using a number field sieve, a function field sieve, or the like within predetermined processing time, it is determined that it is easy to calculate the order of the element g of the semigroup H (step S204).

A determination result output from the determination unit 253 is input to the evaluation unit 254, and the evaluation unit 254 evaluates the safety of the decryption service providing device 13 based on the determination result. That is, when the determination unit 253 determines that it is difficult to calculate the order of the element or does not determine that it is easy to calculate the order of the element, the evaluation unit 254 outputs an evaluation result indicating that the safety of the decryption service providing device 13 is high (acc) (step S205). On the other hand, when the determination unit 253 does not determine that it is difficult to calculate the order of the element or determines that it is easy to calculate the order of the element, the evaluation unit 254 outputs an evaluation result indicating that the safety of the decryption service providing device 13 is low (rej) (step S206).

The evaluation result output from the evaluation unit 254 is input to the setting device 24 (step S207). The setting device 24 determines whether the evaluation result indicates that the safety is high (step S208). When the evaluation result indicates that the safety is low (rej), the flow returns to step S201. When the evaluation result indicates that the safety is high (acc), the setting device 24 outputs system parameters including the semigroup H and its element g, and sets them in the encryption device 11 and the decryption service providing device 13 (step S209).

Third Embodiment

A third embodiment will next be described. The present embodiment uses a semigroup, calculation of an order of an element of the semigroup being computationally difficult, and a self-correction technique to provide a decryption service. Details of the self-correction technique are disclosed in, for example, Reference Literature 1 (International Publication No. WO 2011/086992), Reference Literature 2 (International Publication No. WO 2012/057134), and the like. Differences from the first embodiment will be mainly described below.

<Configuration>

Figure 5:
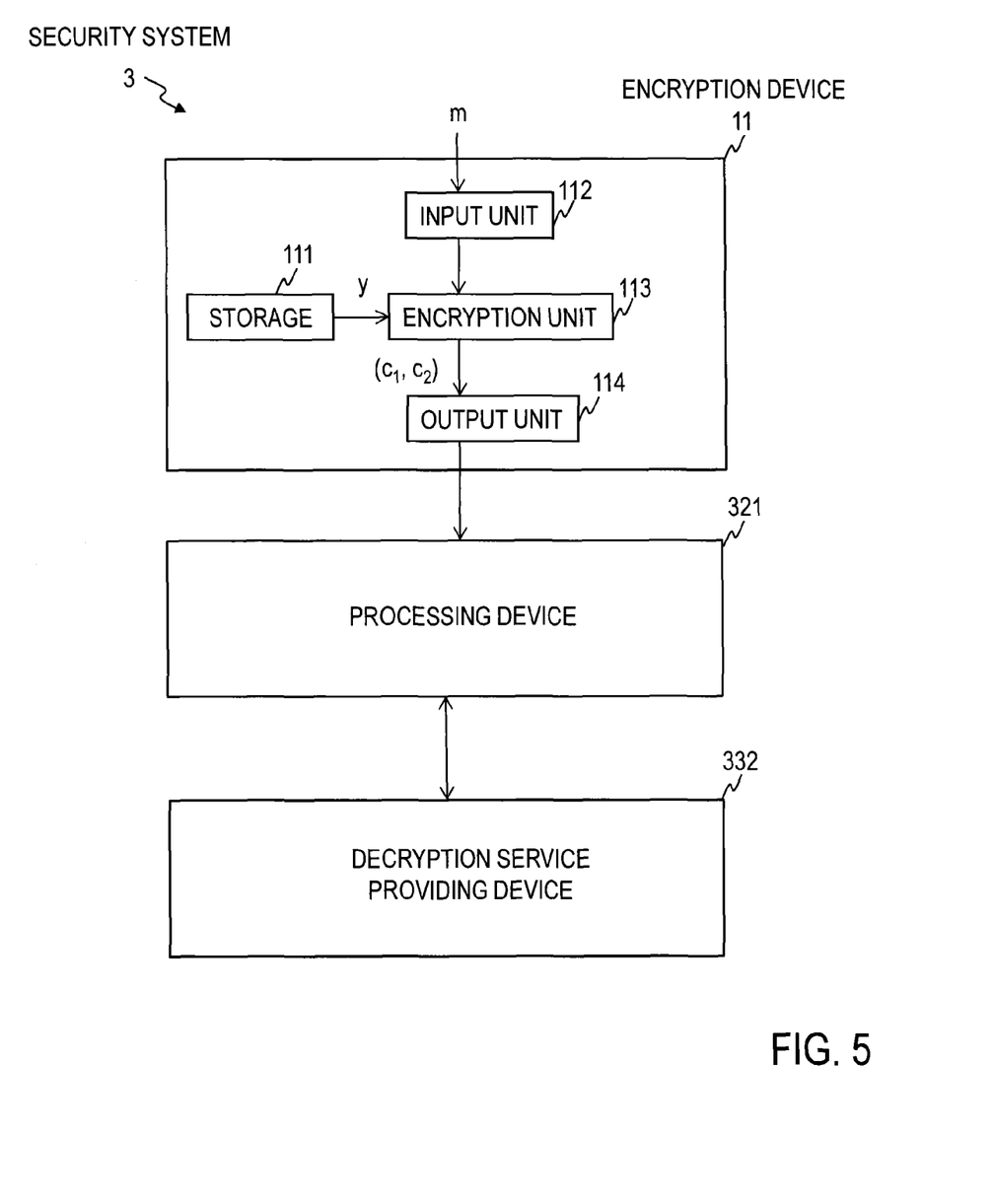
FIG. 5 is a block diagram illustrating a configuration of a security system of a third embodiment.

As illustrated in FIG. 5, a security system 3 of the third embodiment includes, for example, the above encryption device 11, a processing device 321 that does not hold a private key, and a decryption service providing device 332 that holds the private key conforming to the above ElGamal encryption system. The processing device 321 requests the decryption service providing device 332 to provide a ciphertext decryption capability, and decrypts the ciphertext using the decryption capability provided from the decryption service providing device 332. The processing device 321 and the decryption service providing device 332 are configured to be able to exchange information with each other. For example, the processing device 321 and the decryption service providing device 332 can exchange information with each other through a transmission line, a network, a portable recording medium, or the like.

Figure 6:
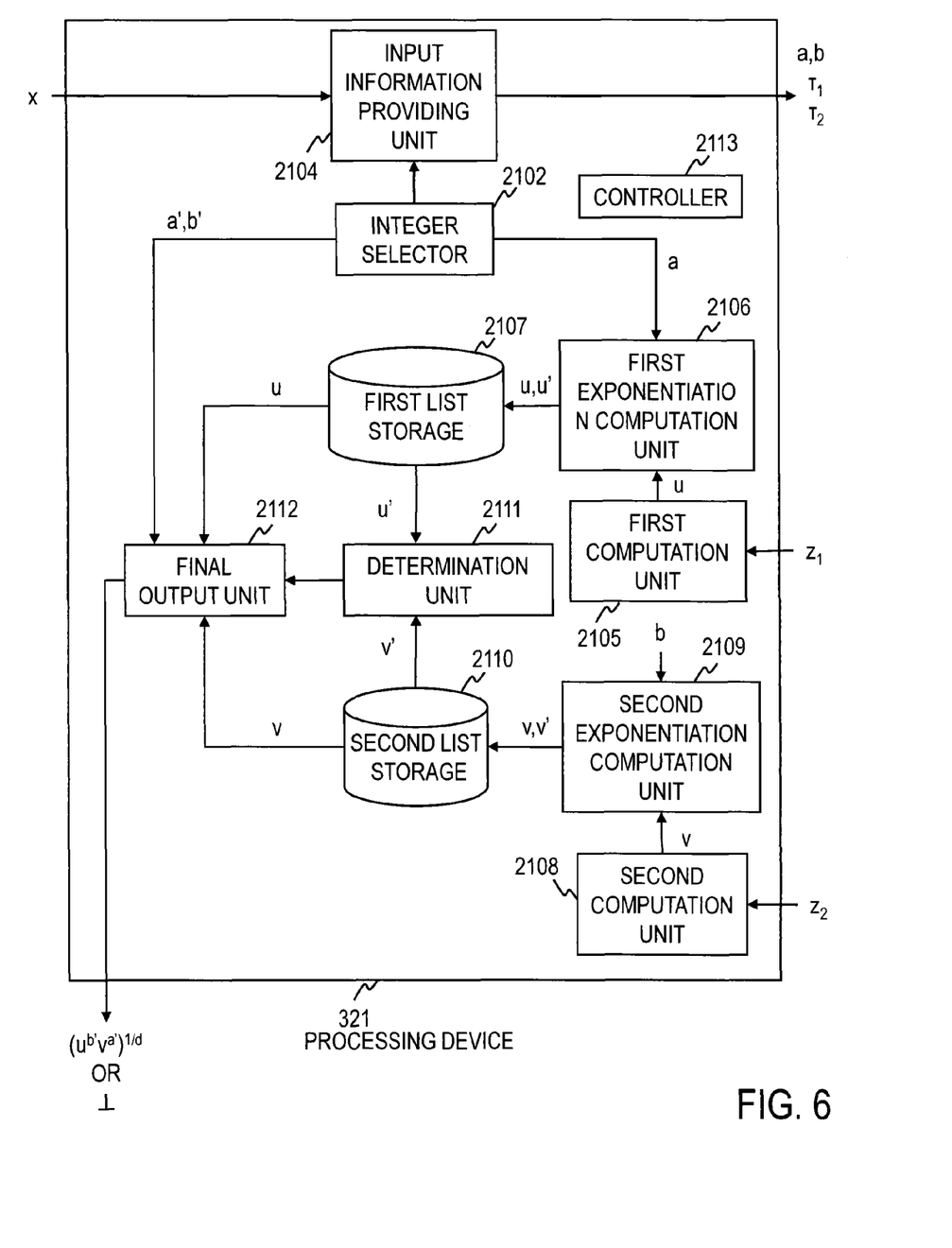
FIG. 6 is a block diagram illustrating a configuration of a processing device of the third embodiment.

As illustrated in FIG. 6, the processing device 321 of the third embodiment includes, for example, an integer selector 2102, an input information providing unit 2104, a first computation unit 2105, a first exponentiation computation unit 2106, a first list storage 2107, a second computation unit 2108, a second exponentiation computation unit 2109, a second list storage 2110, a determination unit 2111, a final output unit 2112, and a controller 2113. An example of the processing device 321 is a device such as a card reader/writer device or a mobile telephone with the computation and storage functions, a known or dedicated computer with a central processing unit (CPU) or random-access memory (RAM) to which a special program is read, or the like.

Figure 7:
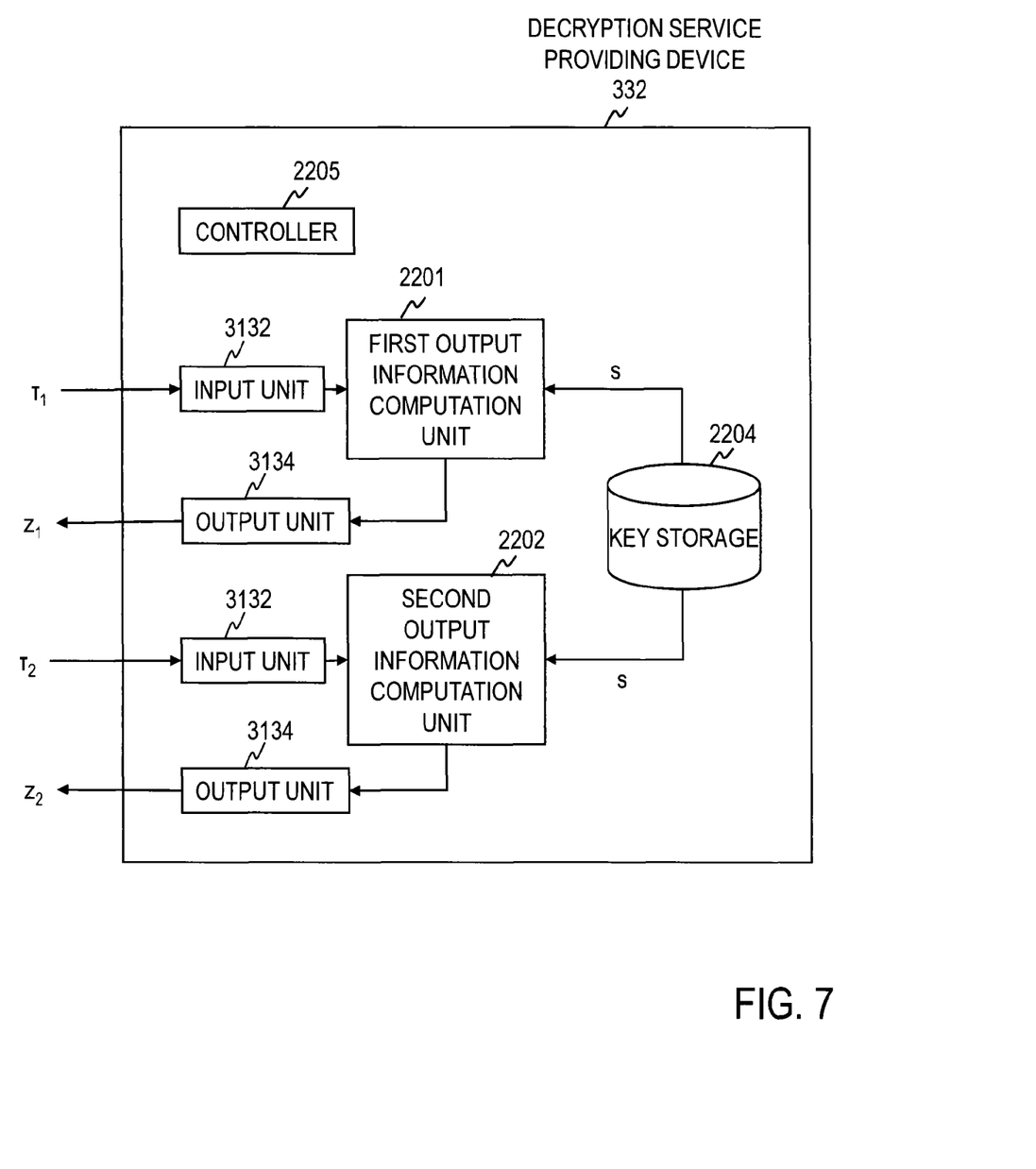
FIG. 7 is a block diagram illustrating a configuration of a decryption service providing device of the third embodiment.

As illustrated in FIG. 7, the decryption service providing device 332 of the third embodiment includes, for example, a first output information computation unit 2201 (decryption unit), a second output information computation unit 2202 (decryption unit), a key storage 2204 (storage), a controller 2205, an input unit 3132, and an output unit 3134. An example of the decryption service providing device 332 is a tamper-resistant module such as an IC card or an IC chip, a device such as a mobile telephone with the computation and storage functions, a known or dedicated computer with a CPU or RAM to which a special program is read, or the like.

<Processing>

Processing of the present embodiment will next be described. For the processing, assuming that G and H are semigroups, calculation of orders of elements of the semigroups being computationally difficult (for example, commutative semigroups or finite commutative semigroups) (for example, H=G×G, H=G), f(x) is a decryption function for obtaining an element of the semigroup G by decrypting ciphertext x that is an element of the semigroup H with the specific private key s in conformance to the above ElGamal encryption system, generating elements of the semigroup G and H are $\mu_g$ and $\mu_h$, respectively, $X_1$ and $X_2$ are probability variables having values in the semigroup G, a realization of the probability variable $X_1$ is $x_1$, and a realization of the probability variable $X_2$ is $x_2$. Each processing by the processing device 321 is performed under control of the controller 2113, and each processing by the decryption service providing device 332 is performed under control of the controller 2205.

Figure 8:
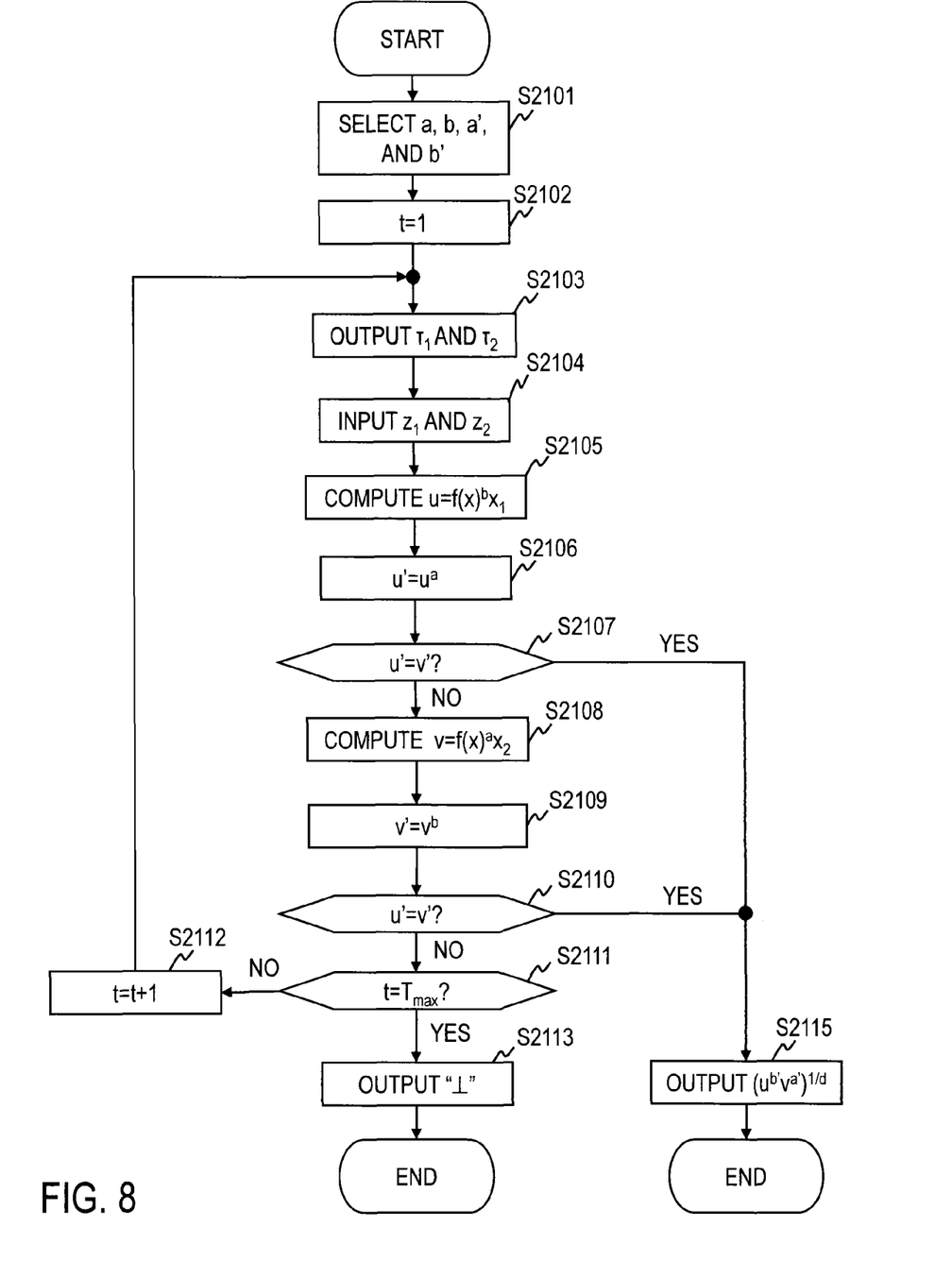
FIG. 8 is a flow diagram illustrating processing by the processing device of the third embodiment.

As illustrated in FIG. 8, the integer selector 2102 of the processing device 321 (FIG. 6) first selects integers a, b, a', and b' (step S2101). For example, a and b are relatively prime natural numbers. For example, a and b are randomly selected. a' and b' may be randomly selected or may be selected to satisfy that d=a'a+b'b. At least part of the information for the integers a and b is sent to the input information providing unit 2104, the first exponentiation computation unit 2106, and the second exponentiation computation unit 2109. The information for the integers a, b, a', and b' is sent to the final output unit 2112.

The controller 1113 regards t=1 (step S2102).

The input information providing unit 2104 generates and outputs first input information $\tau_1$ and second input information $\tau_2$ (information corresponding to the ciphertext x), which are elements of the semigroup H respectively corresponding to the input ciphertext x conforming to the above ElGamal encryption system (step S2103). Preferably, the first input information $\tau_1$ and the second input information $\tau_2$ are information that disturbs a relationship with the ciphertext x, respectively. This enables the processing device 321 to hide the ciphertext x from the decryption service providing device 332. Preferably, the first input information $\tau_1$ of the present embodiment further corresponds to the integer b selected by the integer selector 2102, and the second input information $\tau_2$ corresponds to the integer a selected by the integer selector 2102. This enables the processing device 321 to evaluate the decryption capability provided from the decryption service providing device 332 with a high degree of accuracy. Specific examples of $\tau_1$ and $\tau_2$ are illustrated in, for example, Reference Literature 1, Reference Literature 2, and the like. For example, x=($c_1$, $c_2$), (V, W) is an element of the group H, f(V, W)=Y, $r_4$ to $r_7$ are random natural numbers which are equal to or larger than 0, $\tau_1=(c_2^b W^{r4}, c_1^b V^{r4}\mu_g^{r5})$, and $\tau_2=(c_2^a W^{r6}, c_1^a V^{r6}\mu_g^{r7})$.

Figure 9:
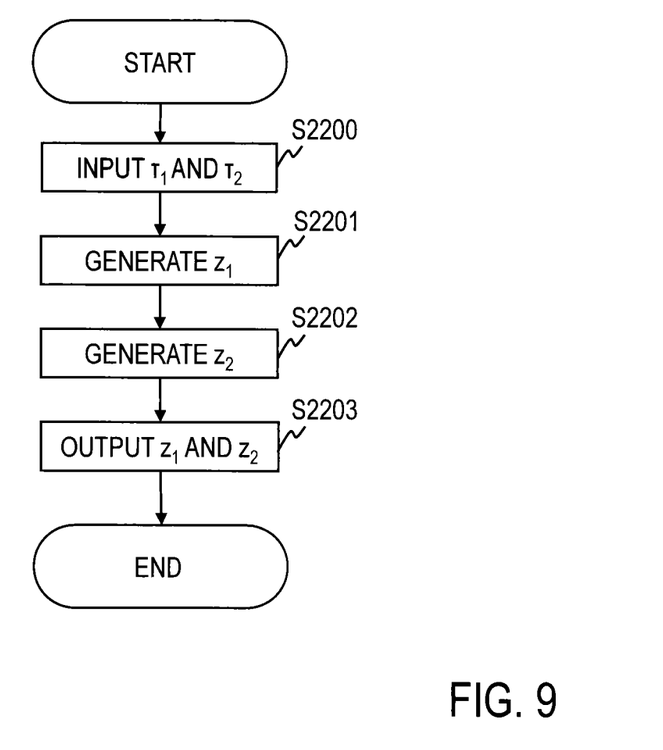
FIG. 9 is a flow diagram illustrating processing by the decryption service providing device of the third embodiment.

As illustrated in FIG. 9, the first input information $\tau_1$ is input to the input unit 3132 of the decryption service providing device 332 (FIG. 7), and then input to the first output information computation unit 2201. The second input information $\tau_2$ is input to the input unit 3132, and then input to the second output information computation unit 2202 (step S2200).

The first output information computation unit 2201 uses the first input information $\tau_1$ and the private key s stored in the key storage 2204, correctly computes f($\tau_1$) with a larger probability than a certain probability, and regards an obtained calculation result as first output information $z_1$. That is, the first output information computation unit 2201 is capable of correctly computing f($\tau_1$) using the first input information $\tau_1$ and the private key s stored in the key storage 2204 and recognizes the obtained calculation result as the first output result $z_1$ (step S2201). The second output information computation unit 2202 uses the second input information $\tau_2$ and the private key s stored in the key storage 1204, correctly computes f($\tau_2$) with a larger probability than a certain probability, and regards an obtained calculation result as second output information $z_2$. That is, the second output information computation unit 2202 is capable of correctly computing f($\tau_2$) using the second input information $\tau_2$ and the private key s stored in the key storage 1204 and recognizes the obtained calculation result as the second output result $z_2$ (step S2202). That is, the first output information computation unit 2201 or the second output information computation unit 2202 outputs a computation result that includes an intended or unintended error. That is, the computation result in the first output information computation unit 2201 may be f($\tau_1$) or may not be f($\tau_1$), and the computation result in the second output information computation unit 2202 may be f($\tau_2$) or may not be f($\tau_2$). The "capability of computing" means a capability of performing a computation with a probability larger than or equal to a non-negligible probability. The "non-negligible probability" is a probability larger than or equal to 1/F(k) where a polynomial that is a weakly monotonic function for a security parameter k is a polynomial F(k).

The first output information computation unit 2201 outputs the first output information $z_1$, the second output information computation unit 2202 outputs the second output information $z_2$, and the output unit 3134 outputs the first output information $z_1$ and the second output information $z_2$ (information corresponding to a ciphertext x decryption result) (step S2203).

Returning to FIG. 8, the first output information $z_1$ is input to the first computation unit 2105 of the processing device 321 (FIG. 6), and the second output information $z_2$ is input to the second computation unit 2108. The first output information $z_1$ and the second output information $z_2$ correspond to the decryption capability given from the decryption service providing device 332 to the processing device 321 (step S2104).

The first computation unit 2105 generates a computation result u=f(x)$^b x_1$ from the first output information $z_1$ (that satisfies u=$z_1 Y^{-r4}\mu_g^{-r5}$, for example). The computation result u is sent to the first exponentiation computation unit 2106 (step S2105).

The first exponentiation computation unit 2106 computes u'=u$^a$. A pair of the computation result u and u' computed based on the computation result (u, u') is stored in the first list storage 2107 (step S2106).

The determination unit 2111 determines whether u'=v' is found in the pair (u, u') stored in the first list storage 2107 and the pair (v, v') stored in the second list storage 2110 (step S2107). If the pair (v, v') is not stored in the second list storage 2110, the processing in this step S2107 is not performed, and the processing in the next step S2108 is performed. If u'=v' is found, the flow proceeds to step S2115. If u'=v' is not found, the flow proceeds to step S2108.

In step S2108, the second computation unit 2108 generates a computation result v=f(x)$^a x_2$ from the second computation information $z_2$ (that satisfies v=$z_2 Y^{-r6}\mu_g^{-r7}$, for example). The computation result v is sent to the second exponentiation computation unit 2109 (step S2108).

The second exponentiation computation unit 2109 computes $v'=v^b$. A pair of the computation result v and v' computed based on the computation result (v, v') is stored in the second list storage 2110 (step S2109).

The determination unit 2111 determines whether u'=v' is found in the pair (u, u') stored in the first list storage 2107 and the pair (v, v') stored in the second list storage 2110 (step S2110). If u'=v' is found, the flow proceeds to step S2115. If u'=v' is not found, the flow proceeds to step S2111.

In step S2111, the controller 2113 determines whether $t=T_{max}$ (step S2111). $T_{max}$ is a predetermined natural number. If $t=T_{max}$, the controller 2113 outputs information indicating that a computation could not be performed, such as a symbol "⊥" (step S2113), and finishes the processing. If $t=T_{max}$ is not satisfied, the controller 2113 increments t by 1, that is, t=t+1 (step S2112), and the flow returns to step S2103.

In step S2115, the final output unit 2112 uses u and v that correspond to u' and v' that satisfy u'=v' and a', b', and d that satisfy d=a'a+b'b (for example, d=1), computes and outputs $(u^{b'}v^{a'})^{1/d}$ (step S2115). That is, the final output unit 2112 outputs $(u^{b'}v^{a'})^{1/d}$ for d=a'a+b'b. For example, when d=1, the final output unit 2112 outputs $u^{b'}v^{a'}$ for 1=a'a+b'b. The output $(u^{b'}v^{a'})^{1/d}$ is a decryption result f(x) of the ciphertext x with a high probability (for the reason, see, for example, Reference Literature 1 and Reference Literature 2). Moreover, the above processing may be repeated several times and the most frequent value of the values obtained in step S2115 may be a decryption result.

Modification to the Third Embodiment

One of the integers a and b may be a constant such as 1, and at least one of the integers a' and b' may be a constant. Some of the integers a, b, a', and b' may be constants, and some of the processing units or steps may be omitted. For example, when b is a constant 1, selection of the integer b in step S2101 becomes unnecessary, v'=v, and the second exponentiation computation unit 2109 and step S2109 become unnecessary. Alternatively, d may be a constant or a random number, and the integers a, b, a', and b' that satisfy d=a'a+b'b may be selected in step S2101. Alternatively, d=a'a+b'b may be computed in step S2115. Alternatively, the integer selector 2102 may select the integers a, b, a', and b' and compute d=a'a+b'b in step S2101. Alternatively, the integer selector 2102 may compute d=a'a+b'b at any time point after step S2102 but before step S2115. Moreover, the final output unit 2112 may output $(u^{b'}v^{a'})^{1/d}$ when d≠0. When d=0, the processing may finish with an error, or when d=0, at least some of the integers a, b, a', and b' may be selected again and the processing may be redone in step S2101. Moreover, before a' or b' is required for an operation, a' or b' may be selected at any time point.

<Other Modifications Etc.>

The present invention is not limited to the above embodiments. For example, groups of a self-correction technique in embodiments in Japanese Patent Application Laid Open No. 2012-237881, Japanese Patent Application Laid Open No. 2012-220834, Japanese Patent Application Laid Open No. 2012-220814, Japanese Patent Application Laid Open No. 2012-151756, and the like may be replaced with the above semigroups. For example, a security system may further include a history saving device that saves a list of users who have received a decryption service provided from the decryption service providing device 13 and a log including decryption results. In the configuration of each embodiment, it is difficult for the user to obtain a private key even if the user repeatedly uses a decryption operation service. Therefore, all decryption results obtained using the private key are output from the decryption service providing device 13. Accordingly, when a decryption result is leaked, for example, information for tracking the leakage route can be obtained by verifying the list of users or the log saved in the history saving device. In addition, in each of the above embodiments, the order of the semigroup H is q, which is the same as the order of the $Z_q$. However, the order of the semigroup H may be larger or smaller than q. Moreover, the semigroup H may not be commutative, depending on the encryption system.

Each type of processing described above may be executed not only time sequentially according to the order in the description but also in parallel or individually when necessary or according to the processing capability of each apparatus that executes the processing. It should be appreciated that appropriate changes can be made to the embodiments without departing from the scope of the present invention.

When the configurations described above are implemented by a computer with a hardware processor such as a CPU, a memory such as a RAM, and the like, the processing details of the functions that should be provided by each apparatus are described in a program. When the program is executed by the computer, the processing functions are implemented on the computer. The program containing the processing details can be recorded in a computer-readable recording medium. An example of the computer-readable recording medium is a non-transitory recording medium. Such recording media include, for example, a magnetic recording device, an optical disc, a magneto-optical recording medium, and a semiconductor memory.

The program is distributed by selling, transferring, or lending a portable recording medium, such as a DVD or a CD-ROM, with the program recorded on it, for example. The program may also be distributed by storing the program in a storage of a server computer and transferring the program from the server computer to another computer through a network.

A computer that executes this type of program first stores the program recorded on a portable recording medium or the program transferred from the server computer in its storage, for example. When executing processing, the computer reads the program stored in its storage and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer.

In the above embodiments, the processing functions of each apparatus are implemented by executing the predetermined program on the computer, but at least part of these processing functions may be implemented by dedicated or general-purpose hardware.

DESCRIPTION OF REFERENCE NUMERALS 1, 2, 3: security system
11: encryption device 12, 321: processing device
13, 332: decryption service providing device
24: setting device
25: safety evaluation device

What is claimed is:

1. A decryption service providing device comprising:
a memory that holds a private key conforming to an ElGamal encryption system on a semigroup, where an order of an element of the semigroup cannot be calculated within a polynomial-time; and
processing circuitry configured to
receive an input of information corresponding to ciphertext conforming to the ElGamal encryption system;
decrypt the information corresponding to the ciphertext in conformance to the ElGamal encryption system using the private key and obtain information corresponding to a result of decrypting the ciphertext; and
output information corresponding to the decryption result.

2. The decryption service providing device according to claim 1, wherein
the private key is s, the semigroup is H, the ciphertext includes an element $c_1$, $c_2 \in H$ of the semigroup H, and the decryption result is $c_1 \cdot c_2^s \in H$.

3. The decryption service providing device according to claim 1 or 2, wherein
G and H are the semigroups, f(x) is a decryption function for obtaining an element of the semigroup G by decrypting the ciphertext x that is an element of the semigroup H with a specific private key in conformance to the ElGamal encryption system, $X_1$ and $X_2$ are probability variables having values in the semigroup G, $x_1$ is a realization of the probability variable $X_1$, $x_2$ is a realization of the probability variable $X_2$, and information corresponding to the ciphertext is first input information $\tau_1$ and second input information $\tau_2$, which are elements of the semigroup H,
the processing circuitry
is correctly capable of computing $f(\tau_1)$ using the first input information $\tau_1$ and regards an obtained calculation result as first output information $z_1$, and
is correctly capable of computing $f(\tau_2)$ using the second input information $\tau_2$ and regards an obtained calculation result as second output information $z_2$, and
information corresponding to the decryption result includes the first output information $z_1$ and the second output information $z_2$.

4. A computer-readable recording medium storing a program for causing a computer to function as the decryption service providing device according to claim 1.

5. A processing device in which G and H are semigroups, where orders of elements of the semigroups cannot be calculated within polynomial-time, f(x) is a decryption function for obtaining an element of the semigroup G by decrypting ciphertext x that is an element of the semigroup H with a specific private key in conformance to an ElGamal encryption system, $X_1$ and $X_2$ are probability variables having values in the semigroup G, $x_1$ is a realization of the probability variable $X_1$, $x_2$ is a realization of the probability variable $X_2$, a, b, a', and b' are integers, $d \neq 0$, and $d = a'a + b'b$,
the processing device comprising:
processing circuitry configured to
generate a computation result $u = f(x)^b x_1$;
generate a computation result $v = f(x)^a x_2$; and
output $(u^{b'} v^{a'})^{1/d}$ when the computation results u and v satisfy $u^a = v^b$.

6. A computer-readable recording medium storing a program for causing a computer to function as the processing device according to claim 5.

7. A safety evaluation device comprising:
processing circuitry configured to
determine whether it is possible or not to calculate an order of an element of a semigroup within polynomial-time, where the semigroup is used for a decryption service providing device that holds a private key conforming to an ElGamal encryption system on the semigroup, receives an input of information corresponding to ciphertext conforming to the ElGamal encryption system, and outputs information corresponding to a result of decrypting the ciphertext obtained by decrypting the information corresponding to the ciphertext in conformance to the ElGamal encryption system using the private key; and
evaluate whether it is possible to make a chosen-ciphertext attack against the decryption service providing device based on whether it is possible or not to calculate the order of the element of the semigroup within the polynomial-time.

8. The safety evaluation device according to claim 7, wherein
the private key is s, the semigroup is H, the ciphertext includes an element $c_1$, $c_2 \in H$ of the semigroup H, and the decryption result is $c_1 \cdot c_2^s \in H$.

9. A computer-readable recording medium storing a program for causing a computer to function as the safety evaluation device according to claim 7.

10. A decryption service providing method comprising:
an input step of receiving an input of information corresponding to ciphertext conforming to an ElGamal encryption system on a semigroup, where an order of an element of the semigroup cannot be calculated within polynomial-time;
a decryption step of decrypting information corresponding to the ciphertext in conformance to the ElGamal encryption system using a private key conforming to the ElGamal encryption system and obtaining information corresponding to a result of decrypting the ciphertext; and
an output step of outputting the information corresponding to the decryption result.

11. The decryption service providing method according to claim 10, wherein
the private key is s, the semigroup is H, the ciphertext includes an element $c_1$, $c_2 \in H$ of the semigroup H, and the decryption result is $c_1 \cdot c_2^s \in H$.

12. The decryption service providing method according to claim 10 or 11, wherein
G and H are the semigroups, f(x) is a decryption function for obtaining an element of the semigroup G by decrypting the ciphertext x that is an element of the semigroup H with a specific private key in conformance to the ElGamal encryption system, $X_1$ and $X_2$ are probability variables having values in the semigroup G, $x_1$ is a realization of the probability variable $X_1$, $x_2$ is a realization of the probability variable $X_2$, and information corresponding to the ciphertext is first input information $\tau_1$ and second input information $\tau_2$, which are elements of the semigroup H,
the decryption step
is correctly capable of computing $f(\tau_1)$ using the first input information $\tau_1$ and regards an obtained calculation result as first output information $z_1$, and is correctly capable of computing $f(\tau_2)$ using the second input information $\tau_2$ and regards an obtained calculation result as second output information $z_2$, and information corresponding to the decryption result includes the first output information $z_1$ and the second output information $z_2$.

13. A processing method in which G and H are semigroups, orders of elements of the semigroups cannot be calculated within polynomial-time, $f(x)$ is a decryption function for obtaining an element of the semigroup G by decrypting ciphertext x that is an element of the semigroup H with a specific private key in conformance to an ElGamal encryption system, $X_1$ and $X_2$ are probability variables having values in the semigroup G, $x_1$ is a realization of the probability variable $X_1$, $x_2$ is a realization of the probability variable $X_2$, a, b, a', and b' are integers, $d \neq 0$, and $d=a'a+b'b$, the processing method comprising:

a first computation step of generating a computation result $u=f(x)^b x_1$;

a second computation step of generating a computation result $v=f(x)^a x_2$; and a final output step of outputting $(u^{b'} v^{a'})^{1/d}$ when the computation results u and v satisfy $u^a=v^b$.

14. A safety evaluation method comprising:

a determination step of determining whether it is possible or not to calculate an order of an element of a semigroup within polynomial-time, where the semigroup is used for a decryption service providing method that holds a private key conforming to an ElGamal encryption system on the semigroup, receives an input of ciphertext conforming to the ElGamal encryption system, and outputs a result of decrypting the ciphertext using the private key in conformance to the ElGamal encryption system; and an evaluation step of evaluating whether it is possible to make a chosen-ciphertext attack against the decryption service providing method based on whether it is possible or not to calculate the order of the element of the semigroup within the polynomial time.

15. The safety evaluation method according to claim 14, wherein the private key is s, the semigroup is H, the ciphertext includes an element $c_1$, $c_2 \in H$ of the semigroup H, and the decryption result is $c_1 \cdot c_2^s \in H$.

* * * * *